(12) United States Patent
Filev et al.

(10) Patent No.: US 7,966,151 B2
(45) Date of Patent: Jun. 21, 2011

(54) METHOD FOR ANALYZING OPERATION OF A MACHINE

(75) Inventors: Dimitar Filev, Novi, MI (US); Paul E. Coffman, Jr., Plymouth, MA (US); Fling Tseng, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 1250 days.

(21) Appl. No.: 11/552,178

(22) Filed: Oct. 24, 2006

(65) Prior Publication Data

US 2008/0188973 A1  Aug. 7, 2008

(51) Int. Cl.
*G06F 17/00* (2006.01)
(52) U.S. Cl. ........ 702/182; 702/183; 702/184; 702/185; 702/186; 702/188; 700/109; 700/110
(58) Field of Classification Search .................. 702/182, 702/183, 184, 185, 186, 188; 700/109, 110
See application file for complete search history.

(56) References Cited

OTHER PUBLICATIONS

Furem, Ken, "Midas," Siemens Energy and Automation, Jul. 2003.*

* cited by examiner

*Primary Examiner* — Sujoy K Kundu
(74) *Attorney, Agent, or Firm* — Raymond L. Caoppiellie; Brooks Kushman P.C.

(57) ABSTRACT

A constraint analysis and reliability agent executes a method for analyzing operation of a manufacturing asset, and includes the steps of collecting operation data for a machine over a plurality of predetermined time periods. The operation data includes a plurality of mutually exclusive events that describe operation of the machine. For each of the predetermined time periods, it is determined whether the machine is in an "ON" or an "OFF" state. Data for the "OFF" states is removed from the collected data to generate a filtered data set. Reliability information is then generated based, at least in part, on the filtered data set. This facilitates predictions of future machine operation.

23 Claims, 8 Drawing Sheets

Fig. 3

| Block No. | Start Time | End Time | #1 | #2 | #4 | #5 | #6 | #7 | #8 | #9 | #10 | #11 | | #1 | #2 | #4 | #5 | #6 | #7 | #8 | #9 | #10 | #11 | | |
|---|---|---|---|---|---|---|---|---|---|---|---|---|---|---|---|---|---|---|---|---|---|---|---|---|---|
| | | | \multicolumn{11}{c|}{NUMBER OF PRODUCTION STATE CHANGES FOR EACH ASSET} | \multicolumn{10}{c|}{ASSET EVIDENCE TABLE} | GROUP EVIDENCE TABLE |
| 49 | 9/17/20XX 4:48 | 9/17/20XX 4:54 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 50 | 9/17/20XX 4:54 | 9/17/20XX 5:00 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 51 | 9/17/20XX 5:00 | 9/17/20XX 5:06 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 52 | 9/17/20XX 5:06 | 9/17/20XX 5:12 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 53 | 9/17/20XX 5:12 | 9/17/20XX 5:18 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 54 | 9/17/20XX 5:18 | 9/17/20XX 5:24 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 55 | 9/17/20XX 5:24 | 9/17/20XX 5:30 | 1 | 1 | 1 | 1 | 1 | 1 | 1 | 1 | 1 | 1 | | 0 | 0 | 0 | 0 | 0 | 0 | 0 | 0 | 0 | 0 | 0 |
| 56 | 9/17/20XX 5:30 | 9/17/20XX 5:36 | 1 | 1 | 4 | 3 | 5 | 3 | 3 | 3 | 3 | 3 | | 0 | 0 | 1 | 0 | 1 | 0 | 0 | 0 | 0 | 0 | 0 |
| 57 | 9/17/20XX 5:36 | 9/17/20XX 5:42 | 8 | 7 | 3 | 1 | 1 | 1 | 1 | 1 | 1 | 1 | | 1 | 1 | 0 | 0 | 0 | 0 | 0 | 0 | 0 | 0 | 0 |
| 58 | 9/17/20XX 5:42 | 9/17/20XX 5:48 | 8 | 27 | 18 | 11 | 11 | 12 | 13 | 13 | 13 | 19 | | 1 | 1 | 1 | 1 | 1 | 1 | 1 | 1 | 1 | 1 | 1 |
| 59 | 9/17/20XX 5:48 | 9/17/20XX 5:54 | 12 | 21 | 15 | 7 | 6 | 6 | 5 | 5 | 5 | 6 | | 1 | 1 | 1 | 0 | 0 | 1 | 0 | 1 | 1 | 1 | 1 |
| 60 | 9/17/20XX 5:54 | 9/17/20XX 6:00 | 13 | 17 | 9 | 7 | 12 | 8 | 9 | 9 | 8 | 16 | | 1 | 1 | 1 | 0 | 1 | 1 | 1 | 1 | 1 | 1 | 1 |
| 61 | 9/17/20XX 6:00 | 9/17/20XX 6:06 | 18 | 27 | 14 | 11 | 11 | 10 | 9 | 10 | 11 | 18 | | 1 | 1 | 1 | 1 | 1 | 1 | 1 | 1 | 1 | 1 | 1 |
| 62 | 9/17/20XX 6:06 | 9/17/20XX 6:12 | 12 | 27 | 12 | 11 | 10 | 11 | 11 | 10 | 10 | 15 | | 1 | 1 | 1 | 1 | 1 | 1 | 1 | 1 | 1 | 1 | 1 |
| 63 | 9/17/20XX 6:12 | 9/17/20XX 6:18 | 6 | 9 | 6 | 5 | 4 | 6 | 7 | 7 | 6 | 11 | | 1 | 1 | 1 | 1 | 1 | 1 | 1 | 1 | 1 | 1 | 1 |
| 64 | 9/17/20XX 6:18 | 9/17/20XX 6:24 | 15 | 23 | 13 | 9 | 7 | 9 | 9 | 9 | 9 | 14 | | 1 | 1 | 1 | 1 | 1 | 1 | 1 | 1 | 1 | 1 | 1 |
| 65 | 9/17/20XX 6:24 | 9/17/20XX 6:30 | 16 | 15 | 11 | 5 | 6 | 4 | 3 | 3 | 3 | 4 | | 1 | 1 | 1 | 1 | 1 | 1 | 1 | 1 | 1 | 1 | 1 |
| 66 | 9/17/20XX 6:30 | 9/17/20XX 6:36 | 19 | 20 | 10 | 9 | 10 | 9 | 9 | 10 | 10 | 19 | | 1 | 1 | 1 | 1 | 1 | 1 | 1 | 1 | 1 | 1 | 1 |

| DISTRIBUTION NAME | PARAMETER_1 | PARAMETER_2 | PARAMETER_3 |
|---|---|---|---|
| WEIBULL | 2.3369E+04 | 5.34450E-01 | 8.389E-01 |
| GAMMA | 4.01532E-01 | 9.31467E+04 | 9.906E-01 |
| EXPONENTIAL | 3.74014E+04 | | 5.908E-04 |
| RAYLEIGH | 4.52248E+04 | | 5.639E-16 |
| POISSON | 3.74014E+04 | | 1.927E-32 |
| NORMAL | 3.74014E+04 | 5.22562E+04 | 1.920E-04 |
| LOGNORMAL | 8.89166E+00 | 2.72569E+00 | 6.580E-02 |
| ERLANG | 1.00000E+00 | 4.47600E+04 | 1.823E-04 |

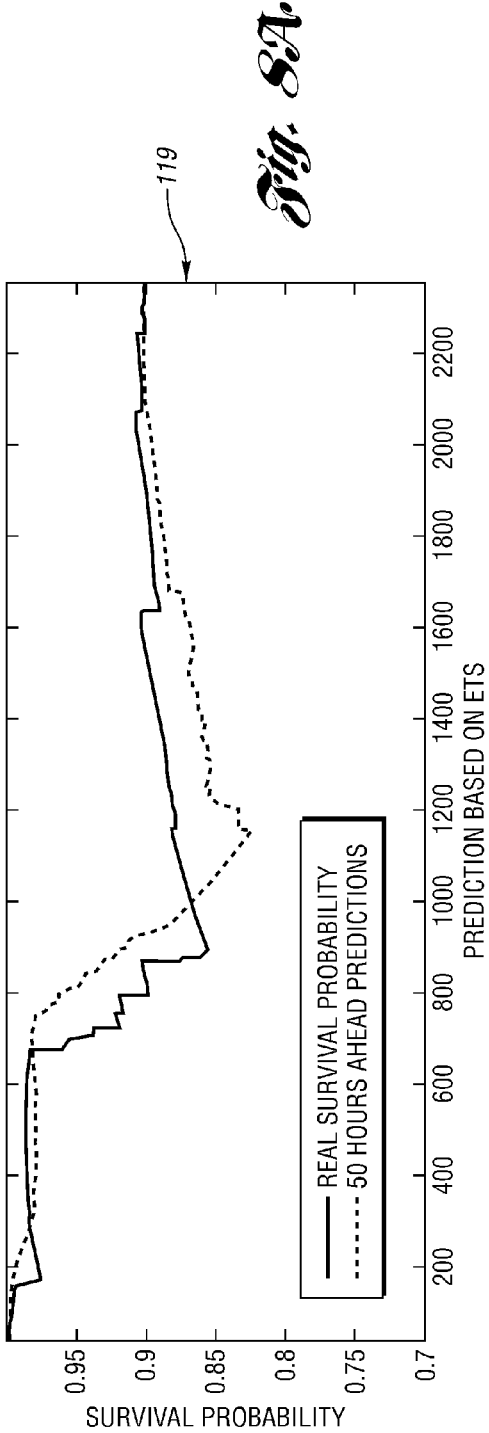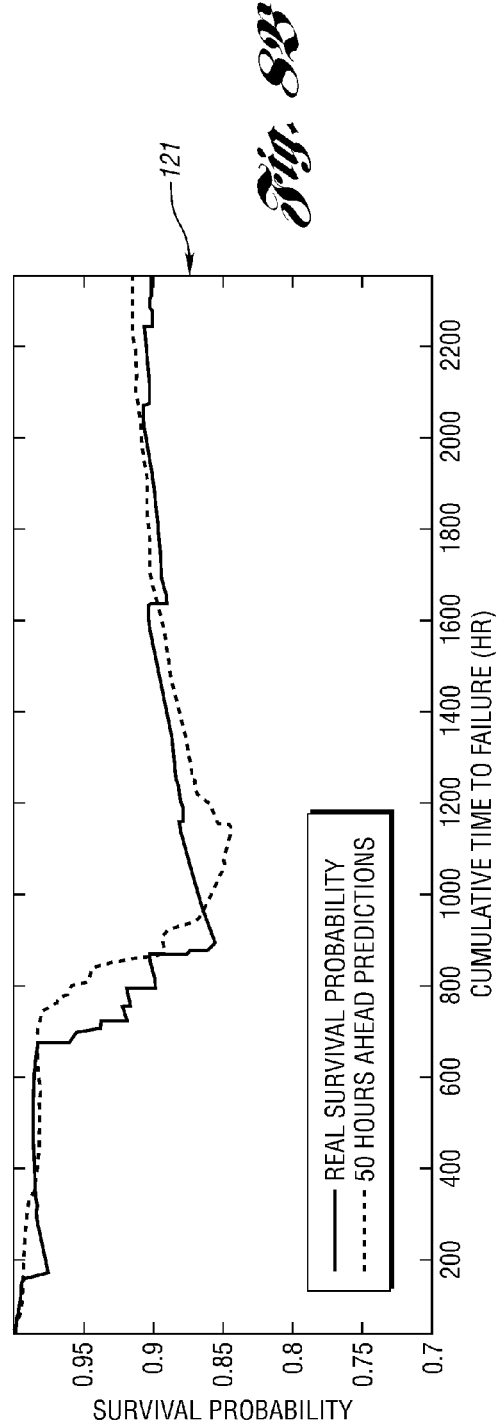
Fig. 8A.
Fig. 8B.

METHOD FOR ANALYZING OPERATION OF A MACHINE

BACKGROUND OF THE INVENTION

1. Field of the Invention

The present invention relates to a method for analyzing operation of a machine, and in particular, a method of reliability and constraint analysis for a machine.

2. Background Art

Recently, Factory Information Systems (FIS's) have become an important tool in automotive manufacturing. They can provide important information about the operation of various "assets", such as robots, conveyor drives, weld guns, pumps, or other equipment used in manufacturing. A typical automotive FIS is based on a three layer information architecture, including a lower layer of asset controlling programmable logic controllers (PLC's), an intermediate layer of transfer PLC's, and a layer of servers that are accessible from an office automation (OA) network. Each of the asset controlling PLC's sends to a respective one of the transfer PLC's a standard package of data blocks. These data blocks can include, for example, data related to some or all of the following: cycle time, blocked time, starve time, downtime, fault vectors, and machine process parameters.

It is generally understood that cycle time includes the time during which a machine is performing its intended manufacturing operation, such as rotating, welding, stamping, spraying, etc., or it is in the process of preparing to do so—e.g., a portion of it is moving from one position to another, or it is changing tools. Conversely, a "blocked time" is a time during which the machine is forced to be idle because the next machine in the work cell or line is not ready to receive another part. A similar situation occurs when the prior machine in the work cell or line has not finished its operations, and therefore has no parts to transfer to the machine under analysis: in such a case, the machine is "starved". "Downtime" can occur for any number of reasons, including tool breakage, machine failure, etc. As noted above, the data blocks can also include process parameters, which can include such information as standard cycle times, tool changes, number of operations, etc.

In the model discussed above, the transfer PLC's in one area may be linked in a virtual local area network (VLAN) with a gateway personal computer (PC) that isolates the lower layer of controlling PLC's from the OA net. The data for each area is organized in a database and stored on a server that is OA accessible. This architecture is the foundation of a web enabled FIS that allows for monitoring the operating attributes of the critical assets that are controlled or monitored by the PLC. A number of commercially available FIS's are commonly used in automotive manufacturing plants.

Despite providing some benefits over manual data collection, conventional FIS's are passive systems that produce predefined reports, and have limited analytical, modeling, and prognostic capability. These systems operate as a decision supporting tool, rather than a proactive algorithmic instrument that can autonomously implement and optimize some of the traditionally manual activities like evaluation of data integrity and feasibility, equipment reliability assessment, bottleneck constraint analysis, etc.

Therefore, a need exists for a method for automatically implementing at least some of these activities, for example, through an automatic reliability and constraint analysis agent that can be applied in a manufacturing environment to facilitate prediction of future machine operation.

SUMMARY OF THE INVENTION

Accordingly, the present invention provides a constraint analysis and reliability agent for implementing a method for analyzing operation a machine or group of machines. Embodiments of the invention can include method steps for one or more of the following:

(a) automatic filtering of outliers and inferring plant schedule based on the state of the assets, (b) automatic evaluation and/or prediction of the survival probability of available assets, (c) automatic on-line learning from the data of the type and parameters of probability distributions for the "time-to-failure" (TTF) and "time-to-repair" (TTR), (d) automatic constraint analysis for all modeled lines of equipment, (e) automatic sensitivity analysis of identified constraints, and (f) automatic prioritization of preventive maintenance based on the bottleneck constraints and survival probability of the assets.

With regard to the first of these features—i.e., automatic filtering of outliers and inferring plant schedule based on the state of the assets—the present invention can perform a number of steps to increase the accuracy of the information generated for machine reliability and constraint analysis. For example, a conventional FIS assumes that an accurate and regularly updated schedule of plant operation is available. In reality, this assumption is not always true, especially in cases when unscheduled breaks and outages occur, or the person responsible for updating the schedule is not available. In order to avoid inaccuracies, the present invention provides a method for continuously analyzing the state of the individual assets, and infers the actual schedule based on the actual data reported by the base FIS.

One feature of the automatic identification of the plant schedule is based on the fact that if a production line is in a normal operating mode, then most of the assets change their state—e.g., cycle, block, down, starve—frequently. It is worth noting that the above four states are not the only ones that can be used with the present invention. Indeed, depending on the machine or machines under analysis, it may be desirable to use different states. It should be considered, however, that to learn an accurate machine schedule, the set of states under consideration should be mutually exclusive, and should completely define the operation of the machine.

One algorithm for inferring the schedule follows the following logic:

(a) each day is split into multiple time blocks—e.g., a 24 hour period may be split into 288 blocks of 5 min each, (b) for each time block, if an asset has multiple cycle, block or starve instances, the asset is "ON"; otherwise, it is "OFF", and (c) for each time block, if most of the assets (in the same line or group) are ON, the line is ON; otherwise, the line is OFF.

The result of application of the above rules provides a filtered data set that can be expressed as a table, called an "evidence table". This table indicates whether each asset or line is operating (denoted with a "1") or is not operating (denoted with a "0"). The evidence table can be further refined by eliminating unnecessary data. A more compact form is obtained by combining blocks with same state and saving only ON or OFF blocks. It is readily understood that if, for example, only the OFF blocks are saved, all non-saved blocks must be ON blocks; therefore, there is no need to separately store this data.

The finalized group evidence table contains the actual time when the particular line or group has been OFF. The evidence table for each group or line can be, for example, calculated on a daily basis and stored. The evidence table can be further used for filtering the outliers. That is, if certain data values, such as cycle times, are significantly different than the mean cycle time for an asset, and have low frequencies, they will be eliminated. The evidence table can also be used to obtain parameters related to asset reliability, such as TTF and TTR data.

As noted above, embodiments of the present invention also provide for automatic evaluation and/or prediction of the survival probability of available assets. Survival functions can be a practical tool for estimating the remaining useful lifetime of a machine, since in essence, they give the probability that a machine is in proper working order at any given time. After enough time has passed, the survival probability will drop to zero, representing a complete and fatal breakdown of the machine.

Different embodiments of the present invention may apply different methodologies to generate an appropriate survival function for an asset. In some embodiments, for example, the data is fit to a Weibull distribution survival function that is estimated for the entire predicted lifetime of the machine. In other embodiments, for example, the data is fit recursively to a linear regression model that predicts the new survival probability one step ahead, and constantly updates itself as each new data point is observed.

To implement the survival probability analysis described above, the present invention may use a survival function takes the general form:

$$S = f(t),$$

where (S) is called the survival probability, and f(t) is some function of time. In some embodiments, (t) can be the cumulative operating time to fail (OTTF). Operating time is defined as time that a machine is not in a faulted state. In other words, it is the time that the machine is cycling (carrying out its intended job), starved, or blocked. For any given machine's data set, a new OTTF is calculated as the total amount of operating time occurring prior to each individual failure of the machine. These OTTF values are then used as the (t) values when fitting the data to an appropriate survival function f(t).

In these embodiments of the present invention, (S) can be, for example, the cumulative survival rate, or the percentage of overall time that a machine had been in a non-faulted state up to that point. This can be calculated by taking the ratio of the OTTF to the sum of the OTTF and the cumulative time spent repairing the machine (TTR):

$$S = \frac{OTTF}{OTTF + TTR} \qquad \text{Eq. 1}$$

For any given machine's data set, a new (S) value is calculated after the repair of any given failure of the machine.

As noted above, the present invention may use a probability density function, such as a Weibull distribution, to help predict survival probability. The probability density function (PDF) of the two-parameter form of the Weibull distribution is defined as:

$$f(t, \alpha, \beta) = \frac{\beta}{\alpha}\left(\frac{t}{\alpha}\right)^{\beta-1} \exp\left(-\left(\frac{t}{\alpha}\right)^{\beta}\right)$$

where (t) is time. The dimensionless shape parameter is ($\beta$) and the scale parameter having the units of time is ($\alpha$). The survival function for the Weibull distribution is the exponential portion of its PDF, and is therefore given by:

$$S(t, \alpha, \beta) = \exp\left(-\left(\frac{t}{\alpha}\right)^{\beta}\right)$$

Before data can be fit to it, this equation must be converted to a linear form, which can be done by taking the double natural log of both sides:

$$\ln(-\ln[S(t,\alpha,\beta)]) = \beta \ln t - \beta \ln \alpha$$

As a result, a recursive linear least square techniques (RLS), or, for example, use of a Kalman filter, is applied to estimate in real time the parameters of the survival function:

$$\ln\left(-\ln\left[\frac{OTTF}{OTTF + TTR}\right]\right) = \beta \ln OTTF - \beta \ln \alpha$$

This model also provides the probability that the machine will be in a faulted state after some given amount of operating time, since the probability of failure is one minus the survival rate.

Also discussed above is that embodiments of the present invention may provide automatic on-line learning of the type and parameters of TTF and TTR probability distributions. Unlike conventional simulation packages that assume either default TTF and TTR distributions—e.g., Exponential or Erlang distributions—or estimate the distributions by fitting historical data, the present invention provides implementations of a constraint analysis algorithm that takes advantage of the fact that information from the on-line updated FIS database is available. This allows the use of an algorithm that periodically evaluates and updates the TTF and TTR distributions with respect to the data collected by the FIS.

In order to evaluate and update the TTF and TTR distributions, the parameters of a number of TTF and TTR probability distributions are examined. In some embodiments of the present invention, the following eight distributions are examined: Weibull, Gamma, Exponential, Rayleigh, Poisson, Normal, Lognormal, and Erlang. The Kolmogorov-Smirnov (K-S) test is applied evaluate the compatibility of collected data and the distributions.

In order to avoid frequent switching of probability distributions, a decision algorithm is used to assess the validity of the learned distributions on a validation data subset that is randomly selected, and that is not used for fitting. The recently adopted distribution (in the very start of the algorithm the Exponential and Erlang distributions are considered as defaults) are stored in a database and are used as defaults. They are replaced only in cases where they are significantly over-performed by the newly learned probability distributions.

As discussed above, embodiments of the present invention also provide a method for constraint analysis, sensitivity analysis, and automatic prioritization of preventive maintenance. These features are now summarized. Traditional Constraint analysis tools are typically heuristic tools using the dominate state of the machine—e.g., downtime or a balance of block and starve conditions—to identify the constraining machine or operation in a production line or system. Although this method may correctly identify the constraining machine or operation, it can be easily "fooled" when several machines with different operating parameters are in the same production line or system (group).

Similarly, when multiple machines or operations combine to form a virtual bottleneck, such traditional approaches cannot identify such combinations. Embodiments of the present invention use a heuristic to identify a list of likely candidate constraints, then run simulation experiments to determine the impact of each candidate on the production rate of the line or system. The likely candidate list is derived by first identifying the "worst" performing machine in the group, then identifying all other machines in the group that are within a fixed percent of the worst machine. Additional intelligence can be added to identify any other likely candidates if desired. This selection is summarized as follows:

If Mi (i=1, 2, ... N) is a list of machines in a group, and (ci, di, bi, si) are (Percent cycling, percent down, percent blocked and percent starved, respectively), then define w=the index of the "worst" machine given by:

$$w = \text{Max}(ci+di)(1 \leq i \leq n) \qquad \text{Eq. 2}$$

and the Candidate set L={i|(cw+dw)−(ci+di)<δ}, where δ=a fixed percent (i.e., 5% or 10%). Let m=the number of elements of set L.

Then, an ad hoc design of experiments (DOE)—or any standard DOE such as full partial factorial designs—can be used to test each candidate in isolation or in combination as to the impact on throughput of making an improvement to that machine or operation. For example, three types of improvements that may be considered are: improved cycle time—e.g., ci'=0.95*ci, improved downtime—e.g., adjusting TTF distribution parameters such that a new mean time-to-failure (MTTF') is greater than a baseline mean time-to-failure (MTTF): MTTF'=1.05*MTTF, and adding or increasing buffers before and after the machine or group. The latter may take the form of increasing buffer size by either a standard amount—e.g., 10 units—or setting the buffer to a value greater than some factor of a mean time-to-repair (MTTR): 2*MTTR/ci.

After completing the sensitivity analysis outlined below, beginning with the results of the single machine constraint analysis, and based on the results of the DOE, the set L can be ordered from highest impact to lowest. An alternative is to use the values of (ci+di) directly to create the order. If desired, additional machines and/or operations can be added to the set using the procedure above to estimate the potential impact of that machine and/or operation. Given the ordered list, and starting with the two highest impact machines, a simulation can be run where both machines are changed—choosing the best parameter to change for each machine.

Next, a third machine is added to the first two machines, and the simulation is rerun. This process is continued until no additional incremental improvements are seen. Alternatively, the simulation can be continued with one or two additional machines, and if no significant improvement is seen, a prior improvement state can be used. This helps to ensure that the simulation algorithm does not end prematurely. This method provides a sequential order in which to make improvements.

Embodiments of the present invention can also perform automatic sensitivity analysis of identified constraints. For example, one DOE is to run the simulation model 3*(m+1) times for each group, plus run it for a base case, wherein all machines are set to an "as observed" condition. The first m+1 runs are performed to change each machine's cycle time as indicated, one at a time, and then a final run is performed where all machines in the group are changed together.

The second m+1 runs follow the same pattern, but the downtime is changed instead of the cycle time. The third group follows the same pattern for buffers before each machine or operation, after each machine or operation, or both. By performing a comparison with the base, the individual machine changes, and the group change results, it is possible to identify if a true single bottleneck exists, or if the bottleneck is multiple machines in combination. This method can give three different bottlenecks, one with respect to each of the three parameters—i.e., cycle time, downtime or decoupling/buffering—potentially giving the plant some options regarding productivity improvements. For a complete sensitivity analysis, the same set of runs is performed, but the parameter is changed to increase instead of decrease.

Automatic prioritization of the preventive maintenance may take place as follows. After a scheduled execution of the method of the present invention, which can be specified, for example, as a weekly or monthly task on a hosting server, each asset is assigned a constraint rank with respect to the line or cell in which it operates. The higher the rank is, the more likely it is the modeled line's constraining asset during simulation.

The automatic prioritization of preventive maintenance is performed by going through all of the available assets seeking those having both relatively low predicted survival probabilities and high constraint ranks within their parent lines. Assets showing traits matching both of these criteria should be assigned a higher priority to have their maintenance activity performed than those that do not have those traits. The capability to produce this list is integrated within the agent used to implement the method of the invention, and the list is updated after each its execution.

Assets that make the list are those with lower reliability and which are dragging down performances of their parent lines. Maintenance schedules and priorities can be adjusted by using the list to make informed decisions to maximize the efficiency and the limited resources of the maintenance group. At the same, utilizing the list can lower risks of unanticipated machine failures.

The present invention also provides a method for analyzing operation of at least one machine. The method includes collecting operation data for a machine over a plurality of predetermined time periods. The operation data includes the respective time for a plurality of events that together form a set of mutually exclusive events that describe operation of the machine. For each of the predetermined time periods, it is determined whether the machine is in an on" state or a "off" state based at least in part on the collected operation data. Data for the OFF states is removed from at least a portion of the collected operation data, thereby generating a filtered data set. Reliability information is generated for the machine based at least in part on the filtered data set. This facilitates predictions of future machine operation.

The invention further provides a method generally as given above, but in which the set of events includes cycle events, starve events, blocked events, and down events. The step of generating reliability information includes determining a time-to-failure parameter using at least the down events from the filtered data set. It also includes determining a time-to-repair parameter using at least the down events from the filtered data set, and choosing a probability density function. The determined parameters are then fitted to the chosen probability density function to generate reliability information for the machine.

The invention also provides a method for analyzing operation of a plurality of machines. The method includes collecting operation data for each of the machines over a plurality of predetermined time periods. The operation data for each machine includes the respective time for a plurality of events that together form a set of mutually exclusive events that describe operation of the respective machine. For each of the predetermined time periods it is determined whether each machine is in an ON state or an OFF state based at least in part on the collected operation data for the respective machine.

Data for the OFF states is removed from at least a portion of the collected operation data, thereby generating a filtered data set. Reliability information is generated for each machine based at least in part on the filtered data set. This facilitates predictions of the future operation of each machine. The reliability information can then be used to perform a constraint analysis for the machines.

BRIEF DESCRIPTION OF THE DRAWINGS

FIG. 3 shows a series of data tables constructed using a method of the present invention;

FIGS. 8A and 8B show graphs illustrating predicted survival functions for a manufacturing asset, generated in accordance with a method of the present invention.

DETAILED DESCRIPTION OF THE PREFERRED EMBODIMENT(S)

Figure 1:
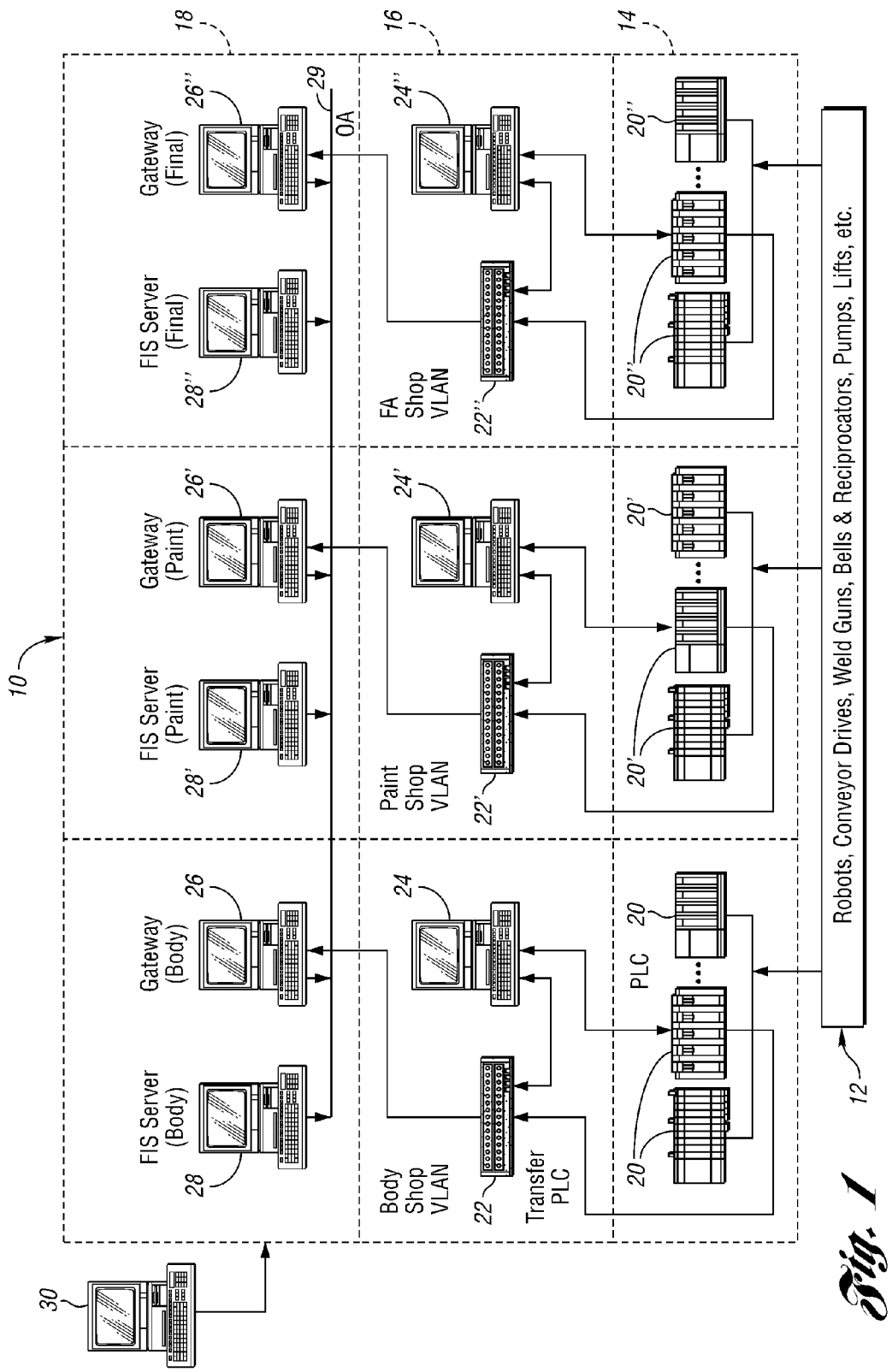
FIG. 1 shows a schematic representation of a Factory Information System in communication with a number of manufacturing assets and a computer configured to run a constraint analysis and reliability agent for performing a method of the present invention.

FIG. 1 shows a schematic representation of a factory information system (FIS) 10 in communication with a number of manufacturing assets 12, such as robots, conveyor drives, weld guns, etc. The FIS 10 is a three-layer system with the first layer 14 including a number of PLC's 20, 20', 20". As shown in FIG. 1, the PLC's 20 are used to control manufacturing assets in a body shop. Similarly, the PLC's 20' are used to control assets used in a paint shop, and the PLC's 20" are used to control assets used in a final assembly (FA) shop. The same nomenclature using the prime and double prime symbols is used throughout the description of the FIS 10 to indicate similar components used in the different manufacturing areas.

The FIS 10 also includes an intermediate layer 16 of transfer PLC's 22, 22', 22", each of which is connected to a respective personal computer 24, 24', 24". Each of the computers 24, 24', 24" is in communication with a respective one of the asset controlling PLC's 20, 20', 20". Each of the transfer PLC's 22, 22', 22" are in communication with a respective gateway computer 26, 26', 26" located in a third layer 18 of the FIS 10. Each of the gateway computers 26, 26', 26" is connected to an office automation (OA) network 29 that includes a respective server computer 28, 28', 28" for each of the manufacturing areas.

Also shown in FIG. 1 is a computer 30 that is configured to run a constraint analysis and reliability agent for performing a method of the present invention. The agent can be programmed into software contained on the computer 30, or it can be written to hardware in the computer 30, or some combination of software and hardware. The computer 30 communicates with the FIS 10, and in particular, with the network 29.

Figure 2:
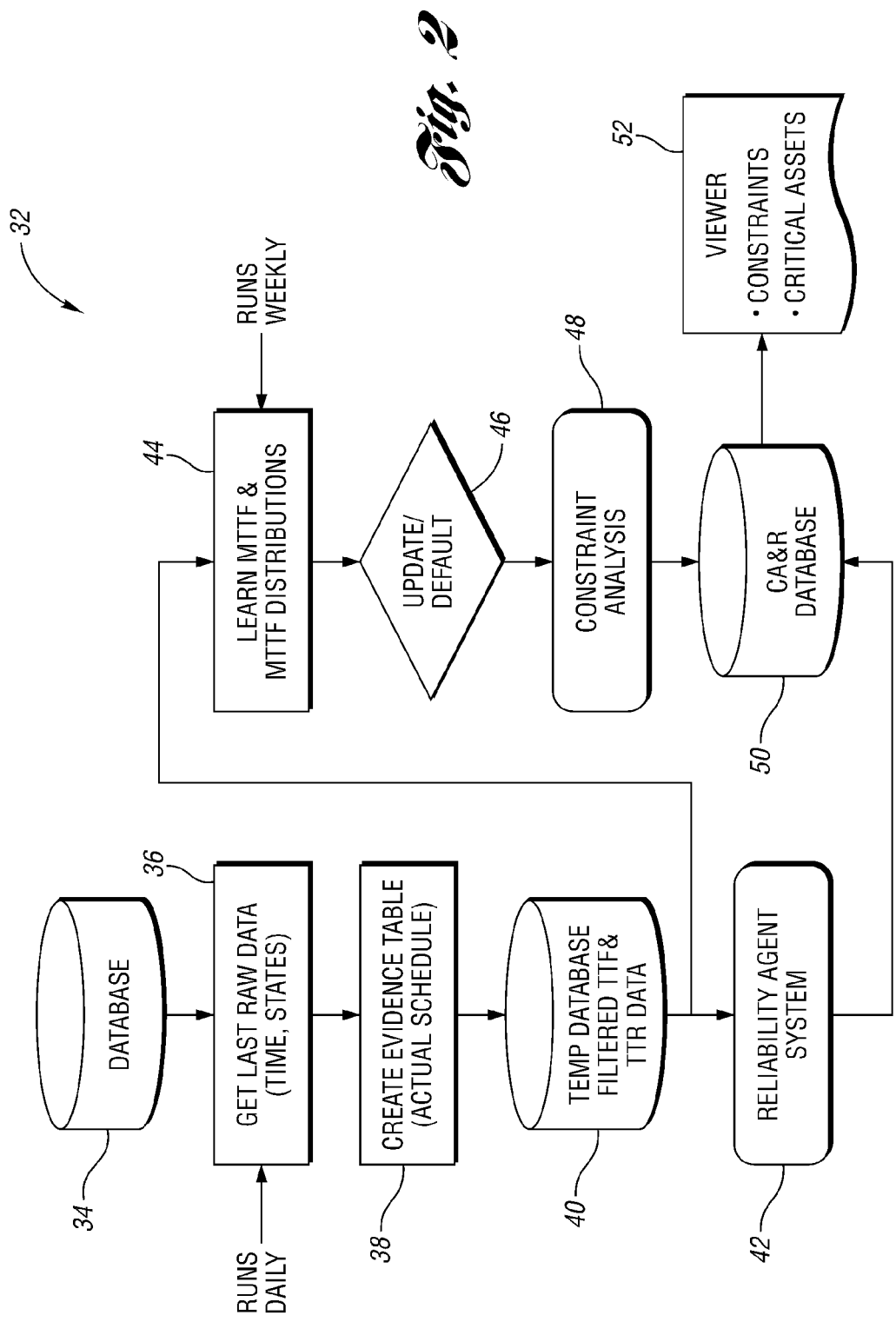
FIG. 2 shows a flowchart illustrating a method of the present invention.

FIG. 2 shows a flowchart 32 illustrating a method in accordance with the present invention. As noted above, this method can be executed, for example, by the computer 30 shown in FIG. 1. Object 34 in FIG. 2 is a database which may, for example, reside on an FIS server, such as the server 28 shown in FIG. 1. At step 36, the method accesses from the database 34 raw data, including times and operating states for the assets under analysis. In the embodiment shown in FIG. 2, step 36 is run daily, though other frequencies may be used. As described above, the times and states for the various manufacturing assets may include a set of states having mutually exclusive events that completely describe operation of the asset being considered. One such set includes the times for cycle events, starve events, blocked events, and down events. These events are observed over a plurality of predetermined time periods which, for example, may be 288 five minute blocks to define a 24 hour day.

After the data is retrieved at step 36, an evidence table is created at step 38. As shown in FIG. 2, the evidence table provides an actual schedule for the manufacturing asset under consideration, which helps to provide accurate data for the reliability and constraint analysis to follow. Each of the following steps are introduced in the flowchart 32, and are described in more detail below. After the evidence table is generated at step 38, a temporary database 40 is propagated with a filtered data set that includes time-to-failure and time-to-repair data. The filtered data set is generated by removing OFF states from the raw data.

Using the information from the database 40 allows a reliability agent system to be implemented at step 42. Alternatively, the database 40 can be used to generate information regarding the mean time-to-failure (MTTF) and the mean time-to-repair (MTTR) probability distributions—see step 44. In the embodiments shown in FIG. 2, step 44 is implemented on a weekly basis, though other frequencies may be used. At decision block 46, the decision is made whether the probability density function used to describe the filter data should be updated, or whether the default distribution should be used. At step 48, a constraint analysis is performed, and data is output to a constraint analysis and reliability (CA&R) database 50. The CA&R database 50 also receives information from the reliability agent system 42. It is from the database 50, that a viewer can retrieve information regarding the constraints and the critical assets in the manufacturing system under consideration—see step 52.

FIG. 3 shows the progression of generating the evidence table in accordance with step 38 shown in FIG. 2. FIG. 3 includes four different data tables 54, 56, 58, 60. Table 54 shows one example of time blocks that can be used in accordance with the present invention. For example, in the embodiment shown in FIG. 3, a plurality of six minute intervals are used to describe a longer time period, such as a shift, or an entire day.

The table 56 provides information regarding the production state changes for each of eleven different assets. As shown in FIG. 3, for time blocks 49-59, each of the eleven assets had only a single production state change. This means that each of the assets had only a single change of state between a cycle event, starve event, blocked event, or down event. In the embodiment shown in FIG. 3, a single change in production state over the predetermined time increment is considered an indication that the asset is in an OFF state. This is indicated in Table 58, which shows a zero for each of the eleven assets during each of the time blocks 49-59. Conversely, Table 56 shows that for some of the assets, more than one production state change occurred during time blocks 60-70. In such a case, the asset is considered to be in an ON state, which is indicated in Table 58 by the numeral 1.

The group evidence table 60 further consolidates data by examining the eleven assets as a group, rather than individually. In a production setting, the eleven assets may each be in the same production line, they may be part of a work cell, or some other configuration in which they work together in a manufacturing process. In the embodiment of the present invention shown in FIG. 3, the asset evidence table is observed for each time block, and if during an individual time block a majority of the assets are in an ON state, then the group of assets is considered to be ON, which is indicated by the numeral 1 in Table 60. Conversely, if less than half of the assets are in an ON state—see e.g., time block 61—then the group is considered to be in an OFF state, which is indicated by a zero in the group evidence Table 60. Thus, the consolidated group evidence table 60 provides at a glance information regarding whether all of the eleven assets was ON or OFF during any of the time blocks.

Figure 4:
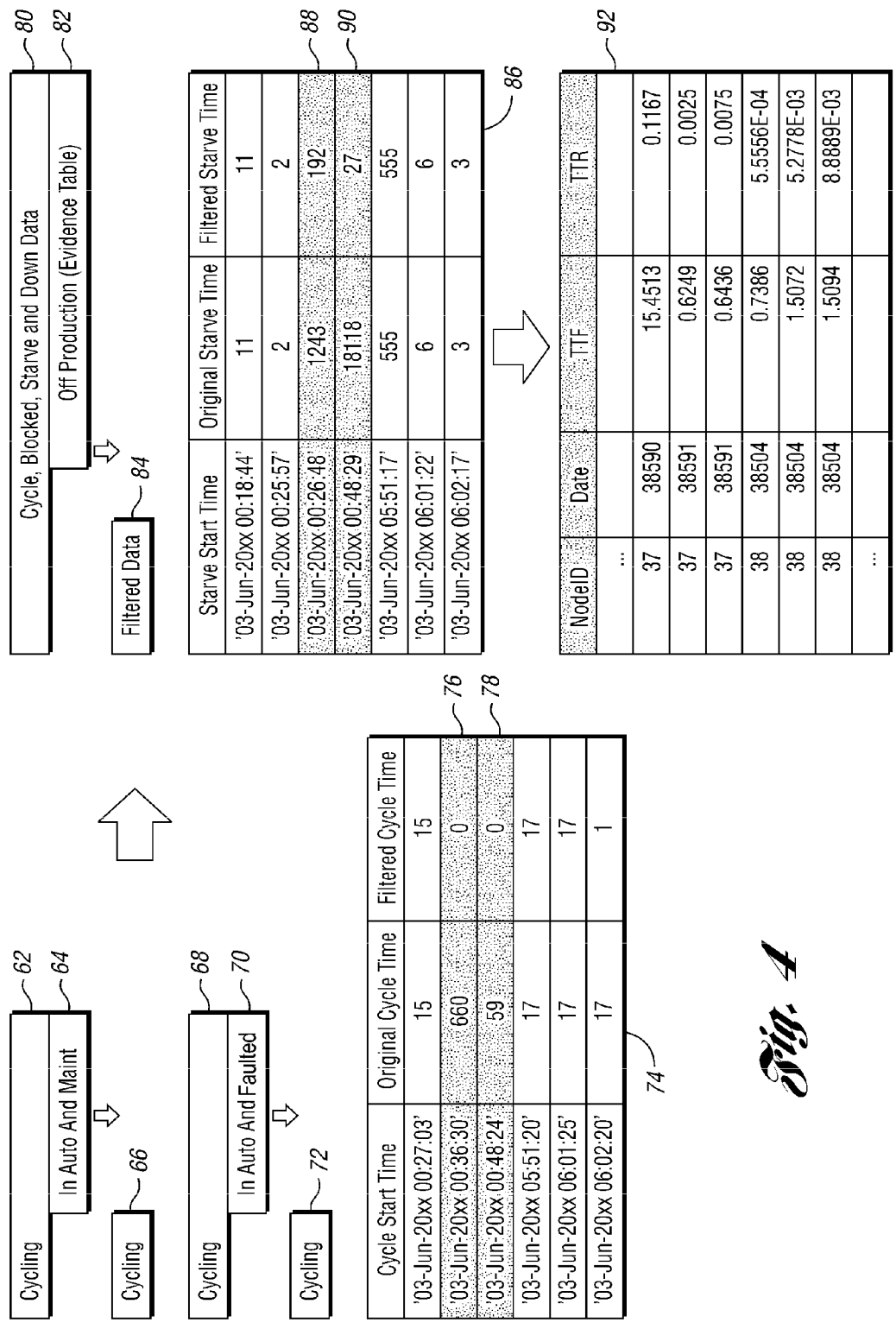
FIG. 4 shows a schematic diagram of a data filtering process in accordance with a method of the present invention.

FIG. 4 is a schematic diagram generally illustrating the generation of the database 40 shown in FIG. 2. As shown in FIG. 4, cycling information 62 has removed from it information related to a special production state: "In Auto And Maint." 64. The "In Auto And Maint." is an automatic mode in which the machine or station is in a maintenance mode. For example, if the machine automatically generates a warning signal upon the occurrence of a fault event, and the operator acknowledges the warning, the machine or station is considered "In Auto And Maint." After removal of the "In Auto And Maint.", for example, when the fault has been eliminated, filtered cycling data 66 remains.

Similarly, cycling data 68 has removed from it data related to "In Auto And Faulted". The "In Auto And Faulted" information is similar to the "In Auto And Maint.", but in this mode, the operator has not yet acknowledged the warning. After the "In Auto And Faulted" data 70 is removed from the cycling data 68, filtered cycling data 72 remains. Table 74 shows a summary of this filtering process wherein the cycling data of blocks 62, 68 have removed from them outlier data entries 76, 78.

In addition to the filtering process removing data related to "In Auto And Maint." and "In Auto And Faulted", the present invention also filters out data related to the asset being in an OFF state. Thus, block 80 shows all of the data including cycle, blocked, starve, and down data, taken from the assets under consideration. Block 82 shows removal of data related to OFF production, which can be gleaned from the evidence table, for example, as shown in FIG. 3. What remains from the combination of filtering the OFF production data and the "In Auto And Maint." and "In Auto And Faulted" is shown as the filtered data set 84. An additional filtering can take place, such as that shown in Table 86. In Table 86, outlier data 88, 90 is removed from the Table 86 to provide more accurate information when generating the Table 92.

The Table 92 shows reliability parameters TTF and TTR for two different node ID's for a number of different dates. The node ID is used to identify a specific asset. As described above, the reliability parameters TTF and TTR can be mathematically combined, for example, as in equation 1, to create another reliability parameter that can be used in a probability density function to facilitate predictions regarding future operation of the asset under consideration. Embodiments of the present invention fit the reliability parameters to a number of different probability density functions, and then choose one of the probability density functions based on the compatibility of the data to the function.

Figure 5:
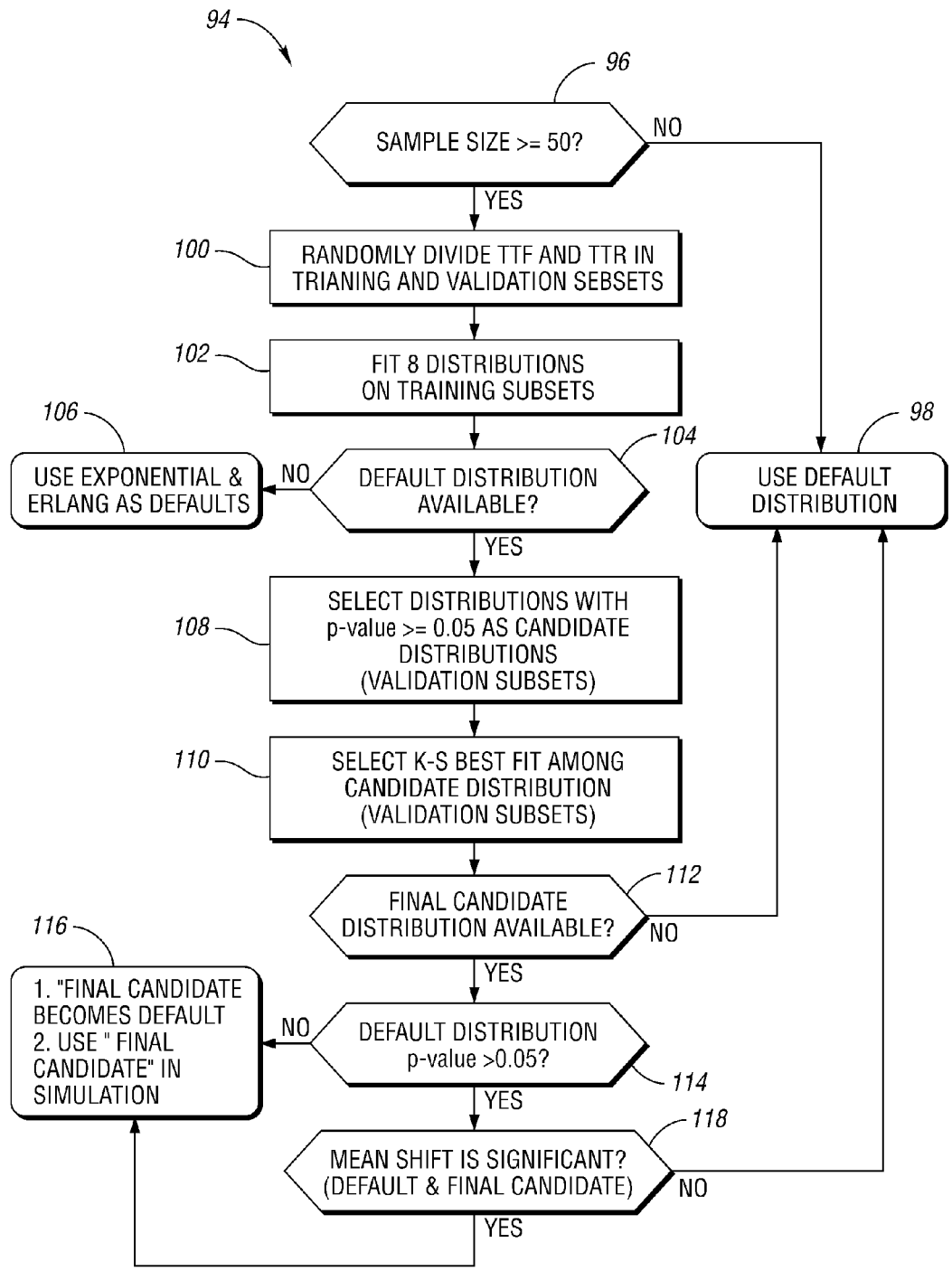
FIG. 5 shows a flowchart illustrating the steps of choosing a probability density function in accordance with a method of the present invention.

FIG. 5 shows a flowchart 94 illustrating the steps of choosing a probability density function in accordance with the present invention. At decision block 96, it is decided whether the sample size available from the data is greater than or equal to 50. If it is not, the flowchart moves to step 98, where the default distribution is used. For some embodiments of the present invention, either an exponential or Erlang probability density function may be used as the default distribution. If, however, the sample size is greater than 50, at step 100, the method randomly divides the TTF and TTR data into training and validation subsets. As step 102, eight different probability density functions are fit with data from the training subsets. Of course, greater or fewer than eight distributions can be used in different embodiments of the present invention. For the embodiment illustrated in FIG. 5, the eight probability density functions used are: Weibull, gamma, exponential, Rayleigh, Poisson, normal, lognormal, and Erlang.

At decision block 104, it is determined whether the default distribution is available—i.e., whether data has been previously fit to a distribution. If a default distribution is not available, step 106 uses the exponential and Erlang distributions as defaults, using the one of these two distributions that best fits the data in the training subset. If, however, at decision block 104 it is determined that a default distribution is available, then distributions with an attained significance level, or p-value, greater than or equal to 0.05 are chosen as candidate distributions—these will be used with the validation subset. At step 110, a K-S test is used to determine the best fit among the probability density function candidates to be used as the final candidate distribution. Again, this will be used on the validation subset of the data.

At decision block 112, it is determined whether a final candidate distribution is available. If it is not, the method loops back to step 98, and the default distribution is used. Conversely, if the final candidate distribution is available, another decision is made at decision block 114. Here, it is determined whether the default distribution has a p-value greater than 0.05. If it does not, the final candidate distribution then becomes the default, and the final candidate distribution is used in a simulation.

If, at decision block 14, it is determined that the default distribution does have a p-value greater than 0.05, it is next determined at decision block 118 whether there is a significant mean shift between the default and the final candidate distributions. If not, the method loops back to step 98, and the default distribution is used. Conversely, if there is a significantly mean shift, the method loops back to step 116, and the final candidate becomes the default and is used in the simulation.

Figures 6, 7:
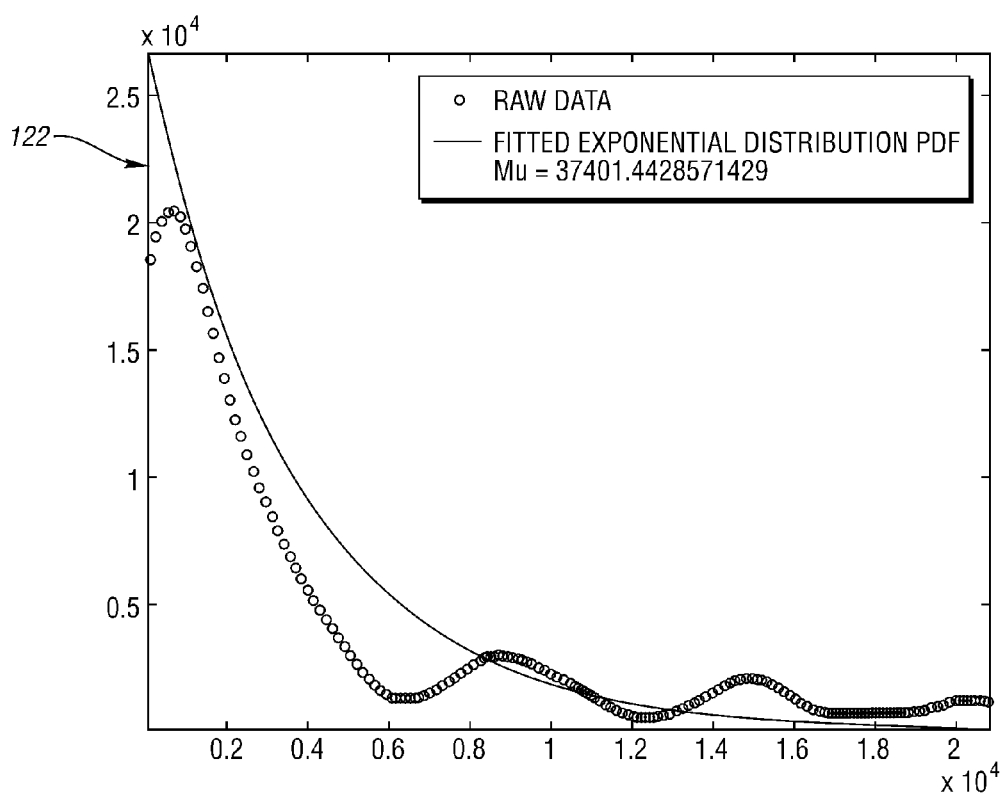
FIG. 6 shows data filtered in accordance with a method of the present invention closely fit to a Weibull probability density function.
FIG. 7 shows a table with eight probability density functions and their associated parameters generated in accordance with a method of the present invention.

FIG. 6 shows a Table 120 indicating each of the eight different probability density functions, along with their associated parameters. Applying the K-S test to each of these probability density functions yields the p-value column on the right of Table 120. As described above, it is desirable to use probability density functions having a high p-value. To the extent that a default distribution has a p-value greater than 0.05, it will be used so that the probability density function is not changed with an undesirably high frequency. As noted above, with the first set of data fitted to a probability density function, either the exponential or Erlang distributions are used as a default. FIG. 7 shows a graph 122 of an initial fitting of a set of raw data to an exponential probability density function. Although the graph 122 is useful to show the close correlation between the raw data and the probability density function chosen, it does not present the data in a form that helps to indicate the reliability of the asset, or predict future behavior.

FIGS. 8A and 8B show two graphs 119, 121, in which a real survival probability has been graphed against predictions made 50 hours ahead. These graphs were generated using filtered data to determine a set of reliability parameters—e.g., a mathematical combination of TTF and TTR—that was then fit to a probability density function and graphed. The graph 119 is based on a transformed Weibull probability density function, while the graft 121 is based on an Evolving Takagi-Sugeno (ETS) model, though other models could be used. The graphs 119, 121 have included the real survival probability to illustrate the close correlation between the predicted reliability determined using the present invention, and the actual reliability.

Figure 9:
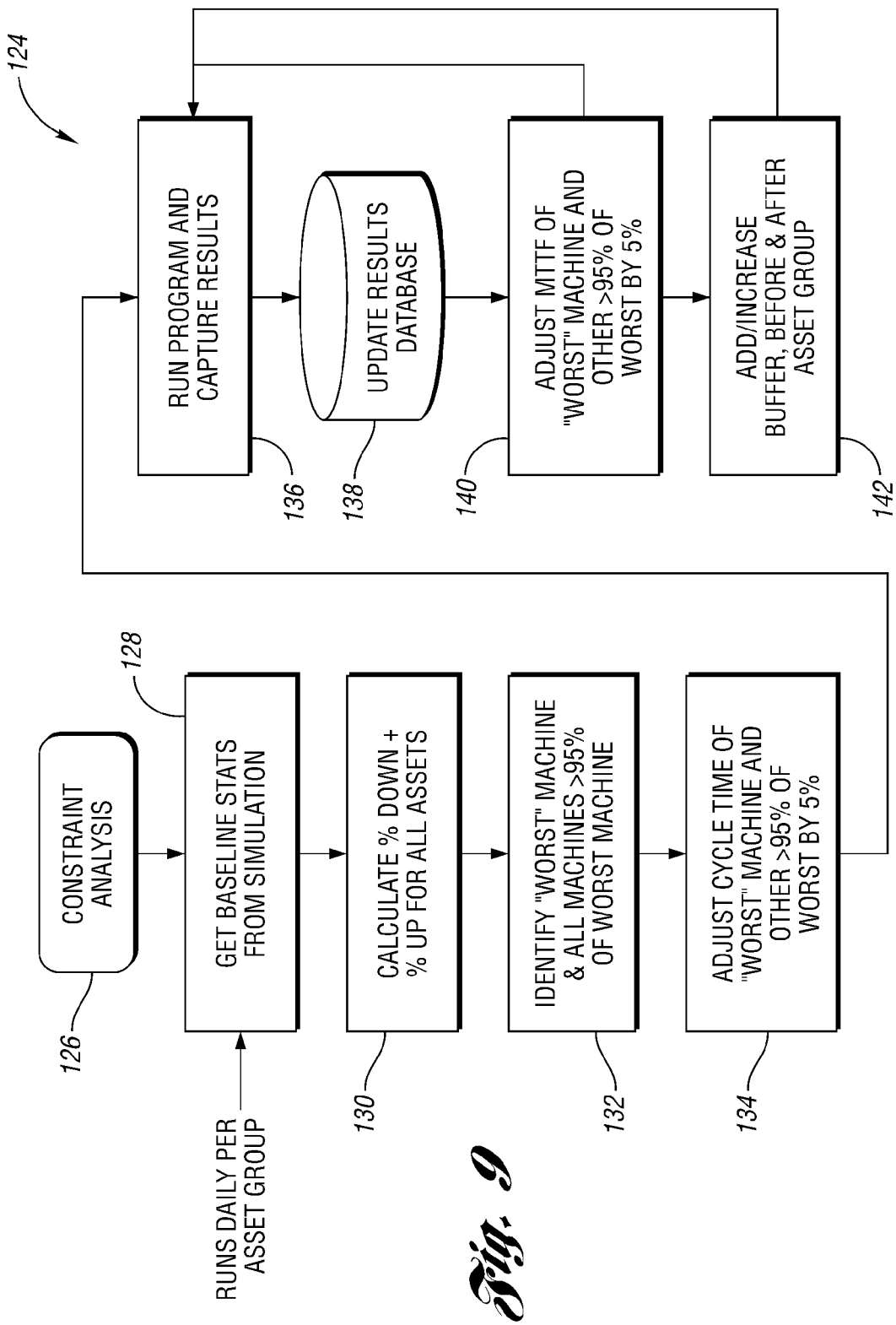
FIG. 9 shows a flowchart illustrating a constraint analysis and sensitivity routine in accordance with a method of the present invention.

In addition to reliability data, the present invention also provides information related to system constraints—e.g., manufacturing assets which alone or in combination create a bottleneck. FIG. 9 shows a flowchart 124 illustrating the steps of a constraint and sensitivity analysis in accordance with the present invention. As indicated at block 126, the constraint analysis is begun and the baseline statistics are gathered from a simulation in block 128. In the embodiment shown in FIG. 9, the simulation is run daily per asset group. At step 130, it is determined for each asset the percent of time it is down. Of course, one minus this value represents the amount of time the asset is up. At step 132, the "worst" machine is identified, for example, as described above using equation 2. Also at step 132, all of the machines within 5% of the worst machine are also identified.

To improve the performance associated with these machines, one parameter that can be adjusted is the cycle time—see step 134. After an adjustment to the cycle time, the method of the present invention is applied again to generate new data, and the results are captured—see step 136. The updated results are then put in a database 138. Another parameter that can be adjusted is the mean time-to-failure of the worst machines. At step 140, this value is adjusted by 5%. The method then loops back to step 136, where the method is again applied to generate new data and update the database at 138. A third parameter which can be adjusted is to add or increase the buffer between the worst machines and adjacent machines. This is indicated in step 142. After this adjustment is made, the method again loops back to step 136 where the method is applied again to generate new data.

As indicated in the flowchart 124 in FIG. 9, this sensitivity analysis is iterative, and provides a mechanism for reducing the constraints in a manufacturing line or work cell. Of course, it is contemplated that the method of the present invention can be run virtually continuously to provide data that is constantly updated to indicate changes in the reliability of various manufacturing assets, and to gauge the effect of modifying certain operating characteristics, such as indicated at steps 134, 140, 142 in FIG. 9. Thus, by ranking each of the machines, for example, according to equation 2, and then identifying a group of the worst machines, bottlenecks within the manufacturing line can be easily identified so that improvements can be made. Moreover, determining the expected reliability for the various manufacturing assets, such as illustrated in FIGS. 8A and 8B, provides a mechanism for predicting future operation of the assets, thereby helping to eliminate constraints prior to their occurrence.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for analyzing operation of at least one machine, comprising:
collecting operation data for a machine over a plurality of predetermined time periods, the operation data including the respective time for a plurality of events that together form a set of mutually exclusive events that describe operation of the machine, the set of events including cycle events, starve events, blocked events, and down events;
determining for each of the predetermined time periods whether the machine is in an "ON" state or an "OFF" state based at least in part on the collected operation data;
removing data for the OFF states from at least a portion of the collected operation data, thereby generating a filtered data set; and
generating reliability information for the machine based at least in part on the filtered data set, thereby facilitating predictions of future machine operation, the step of generating reliability information including:
determining a reliability parameter based at least in part on the down events in the filtered data set;
choosing a probability density function; and
fitting the reliability parameter to the chosen probability density function.

2. The method of claim 1, wherein the machine is considered to be in an ON state for a given one of the predetermined time periods when there is more than one occurrence of a cycle event, a starve event, a blocked event, or a combination thereof during the given predetermined time period.

3. The method of claim 1, wherein the step of determining the reliability parameter includes:
determining a time-to-failure parameter;
determining a time-to-repair parameter; and
mathematically combining the time-to-failure parameter and the time-to-repair parameter to generate the reliability parameter.

4. The method of claim 1, further comprising:
collecting additional operation data for the machine;
determining when the machine is in an ON state and when the machine is an OFF state;
removing data for the OFF states from the additional operation data for the machine and updating the filtered data set;
determining when a failure of the machine has occurred;
determining a time-to-repair the failure;
determining a new reliability parameter from the updated filtered data set;
performing an analysis to determine compatibility between the new reliability parameter and a plurality of probability density functions, thereby generating a plurality of compatibility values;
fitting the new reliability parameter to the probability density function having the best compatibility value when the difference between the best compatibility value and the compatibility value for the chosen probability density function is greater than a predetermined amount; and
fitting the new reliability parameter to the chosen probability density function when the difference between the best compatibility value and the compatibility value for the chosen probability density function is not greater than the predetermined amount.

5. The method of claim 1, further comprising:
defining a work area having a plurality of machines;
collecting corresponding operation data for the machines over the predetermined time periods, the operation data including the time for cycle events, starve events, blocked events, and down events for each respective machine;
determining for each of the machines over each of the predetermined time periods whether the respective machine is in an ON state or an OFF state based at least in part on the respective collected operation data;
removing data for the OFF states from at least a portion of the corresponding collected operation data for each machine, such that the filtered data set includes information for each machine; and
generating reliability information for each machine based at least in part on the filtered data set, thereby facilitating predictions of future operation of each machine.

6. The method of claim 5, wherein the step of generating reliability information for each machine includes:
determining a reliability parameter for each machine based at least in part on the down events for the respective machine in the filtered data set;
choosing a corresponding probability density function for each machine; and
fitting each of the reliability parameters to the respective chosen probability density function.

7. The method of claim 5, further comprising:
determining for each of the predetermined time periods whether the work area is in an ON state or an OFF state based at least in part on whether the machines in the work area are in an ON state or an OFF state, the work area being considered to be in an OFF state for a given one of the predetermined time periods if a predetermined percentage of the machines in the work area are determined to be in an OFF state during the given predetermined time period.

8. The method of claim 7, further comprising removing additional data from at least a portion of the collected operation data to generate the filtered data set, the additional data removed including data for the ON states of the machines during a given one of the predetermined time periods when the work area is determined to be in an OFF state for the given predetermined time period.

9. The method of claim 8, further comprising performing a constraint analysis using the reliability information generated for each of the machines, thereby facilitating identification of bottlenecks within the work area.

10. The method of claim 8, wherein the step of performing a constraint analysis includes:
identifying the machine having the greatest percentage of downtime;
identifying at least one other machine having a percentage of downtime within a predetermined amount of the greatest percentage of downtime; and
analyzing the impact on throughput for each of the identified machines, thereby providing information for reducing constraints.

11. The method of claim 1, further comprising:
determining for each of the predetermined time periods whether the machine is in an "auto and maintenance" state;
determining for each of the predetermined time periods whether the machine is in an "auto and faulted" state; and
removing data for the "auto and maintenance" states and data from the "auto and faulted" states from the collected operation data prior to the step of removing data for the OFF states.

12. A method for analyzing operation of at least one machine, comprising:
collecting operation data for a machine over a plurality of predetermined time periods, the operation data including the time for cycle events, starve events, blocked events, and down events;
determining for each of the predetermined time periods whether the machine is in an "ON" state or an "OFF" state based at least in part on the collected operation data;
removing data for the OFF states from at least a portion of the collected operation data, thereby generating a filtered data set;
determining a time-to-failure parameter using at least the down events from the filtered data set;
determining a time-to-repair parameter using at least the down events from the filtered data set;
choosing a probability density function; and
fitting the determined parameters to the chosen probability density function, thereby generating reliability information for the machine to facilitate predictions of future machine operation.

13. The method of claim 12, further comprising:
collecting additional operation data for the machine over a plurality of additional predetermined time periods;
determining for each of the additional time periods whether the machine is in an ON state or an OFF state based at least in part on the additional collected operation data;
removing data for the OFF states from at least a portion of the additional collected operation data, thereby generating an additional filtered data set;
aggregating the filtered data set and the additional filtered data set, thereby generating a new filtered data set;
determining a new time-to-failure parameter using at least the down events from the new filtered data set after the machine has had a failure;
determining a new time-to-repair parameter using at least the down events from the new filtered data set after the failure has been repaired;
determining whether the new determined parameters should be fit to the chosen probability density function or another probability density function chosen from a predetermined list of probability density functions; and
fitting the new determined parameters to one of the probability density functions, thereby generating reliability information for the machine to facilitate predictions of future machine operation.

14. The method of claim 13, wherein the time-to-repair parameter and the additional time-to-repair parameter are each a mean time-to-repair value, and the time-to-failures parameter and the additional time-to-failure parameter are each a mean time-to-failure.

15. The method of claim 12, wherein the machine is considered to be in an ON state for a given one of the predetermined time periods when there is more than one occurrence of a cycle event, a starve event, a blocked event, or a combination thereof during the given predetermined time period.

16. The method of claim 15, further comprising:
determining for each of the predetermined time periods whether the machine is in an "auto and maintenance" state;

determining for each of the predetermined time periods whether the machine is in an "auto and faulted" state; and removing data for the "auto and maintenance" states and data from the "auto and faulted" states from the collected operation data prior to the step of removing data for the OFF states.

17. The method of claim 12, the machine being part of a work area including a plurality of other machines, the method further comprising:

collecting operation data for the other machines over the predetermined time periods, the operation data for the other machines including the time for cycle events, starve events, blocked events, and down events for each machine;

determining for each of the other machines over each of the predetermined time periods whether the other machine is in an ON state or an OFF state based at least in part on the collected operation data; and determining for each of the predetermined time periods whether the work area is in an ON state or an OFF state based at least in part on whether the machines in the work area are in an ON state or an OFF state.

18. The method of claim 17, wherein the work area is considered to be in an OFF state for a given one of the predetermined time periods if at least half of the machines in the work area are determined to be in an OFF state during the given predetermined time period.

19. The method of claim 18, further comprising:

removing additional data from at least a portion of the collected operation data to generate the filtered data set, the additional data removed including data for the ON states of the machines during a given one of the predetermined time periods when the work area is determined to be in an OFF state for the given predetermined time period.

20. The method of claim 19, further comprising:

determining for each of the machines a constraint parameter related to the time each machine is in an OFF state; and ordering each of the machines according to the determined constraint parameter, thereby providing information regarding bottlenecks in the work area.

21. A method for analyzing operation of at least one machine, comprising:

defining a work area having a plurality of machines;

collecting corresponding operation data for the machines over a plurality of predetermined time periods, the operation data including the respective time for a plurality of events that together form a set of mutually exclusive events that describe operation of the machine, including the time for cycle events, starve events, blocked events, and down events for each respective machine;

determining for each of the machines over each of the predetermined time periods whether the respective machine is in an "ON" state or an "OFF" state based at least in part on the respective collected operation data;

removing data for the OFF states from at least a portion of the corresponding collected operation data for each machine, thereby generating a filtered data set that includes information for each machine; and generating reliability information for each machine based at least in part on the filtered data set, thereby facilitating predictions of future operation of each machine, the step of generating reliability information for each machine including:

determining a reliability parameter for each machine based at least in part on the down events for the respective machine in the filtered data set;

choosing a corresponding probability density function for each machine; and fitting each of the reliability parameters to the respective chosen probability density function.

22. The method of claim 21, further comprising determining for each of the predetermined time periods whether the work area is in an ON state or an OFF state based at least in part on whether the machines in the work area are in an ON state or an OFF state, the work area being considered to be in an OFF state for a given one of the predetermined time periods if a predetermined percentage of the machines in the work area are determined to be in an OFF state during the given predetermined time period.

23. The method of claim 22, further comprising removing additional data from at least a portion of the collected operation data to generate the filtered data set, the additional data removed including data for the ON states of the machines during a given one of the predetermined time periods when the work area is determined to be in an OFF state for the given predetermined time period.

* * * * *